US011080178B2

(12) United States Patent
Shaw

(10) Patent No.: US 11,080,178 B2
(45) Date of Patent: Aug. 3, 2021

(54) RULES TESTING FRAMEWORK

(71) Applicant: PAYPAL, INC., San Jose, CA (US)

(72) Inventor: Prem Shaw, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 280 days.

(21) Appl. No.: 16/236,337

(22) Filed: Dec. 28, 2018

(65) Prior Publication Data

US 2020/0210328 A1 Jul. 2, 2020

(51) Int. Cl.
*G06F 11/00* (2006.01)
*G06F 11/36* (2006.01)
*G06F 16/23* (2019.01)

(52) U.S. Cl.
CPC ...... *G06F 11/3692* (2013.01); *G06F 11/3688* (2013.01); *G06F 16/2379* (2019.01)

(58) Field of Classification Search
CPC .. G06F 11/3692; G06F 11/3688; G06F 11/22; G06F 11/2273; G06F 11/24; G06F 11/26; G06F 11/261; G06F 11/263; G06F 11/2635; G06F 11/273; G06F 11/277; G06F 11/34; G06F 11/3404; G06F 11/3409; G06F 11/3452; G06F 11/3457; G06F 11/3461; G06F 11/3604; G06F 11/3664; G06F 11/3668; G06F 11/3696; G06F 16/2379
See application file for complete search history.

(56) References Cited

U.S. PATENT DOCUMENTS

| 7,685,271 | B1 | 3/2010 | Schneider et al. | |
| 9,830,173 | B1 * | 11/2017 | Kothandaraman | ..... H04L 43/00 |
| 2008/0052360 | A1 | 2/2008 | Jhawar | |
| 2009/0271351 | A1 | 10/2009 | Kandasamy et al. | |
| 2018/0189680 | A1 * | 7/2018 | Gupta | .................. G06Q 40/025 |
| 2020/0004664 | A1 * | 1/2020 | Gonzales | ............ G06F 11/3684 |

* cited by examiner

*Primary Examiner* — Anthony J Amoroso
(74) *Attorney, Agent, or Firm* — Haynes and Boone, LLP

(57) ABSTRACT

A method may include receiving a request for an output decision corresponding to a set of input parameters, the request including a test indication. The method also includes determining that the output decision is dependent on an output of a first module that is configured by default to communicate with a second module, the output of the first module being dependent on the output of the second module. Further, the method includes based on the test indication, causing the first module to transmit an information request to a simulation module, the simulation module identifying a predetermined output value corresponding to the first module in response to the information request. The method also includes generating the output decision according to a decisioning rule that is triggered based on the predetermined output value and transmitting the output decision to a testing module.

20 Claims, 7 Drawing Sheets

RULES TESTING FRAMEWORK

BACKGROUND

Technical Field

This disclosure relates generally to testing code and, more specifically, to implementing a rule testing framework for testing rules in a live production environment.

Description of the Related Art

In today's digital world, testing application code is an important endeavor in ensuring that applications are working as intended. In some situations, one or more applications being executed by a system may be configured to implement a rules engine that dynamically determines which rules of a set of rules to trigger given certain input parameters. Testing that specific rules are working correctly in a live production environment may present certain challenges.

For instance, in order to determine which rules to trigger given the input parameters, an application may request information from various modules. These modules may in turn request information from various other downstream modules, thereby creating a complex chain of output dependencies for these modules with multiple levels in the chain. Thus, in order to test a specific rule in the live production environment, a tester may typically need to fix the output values for each of these modules.

Figure 1:
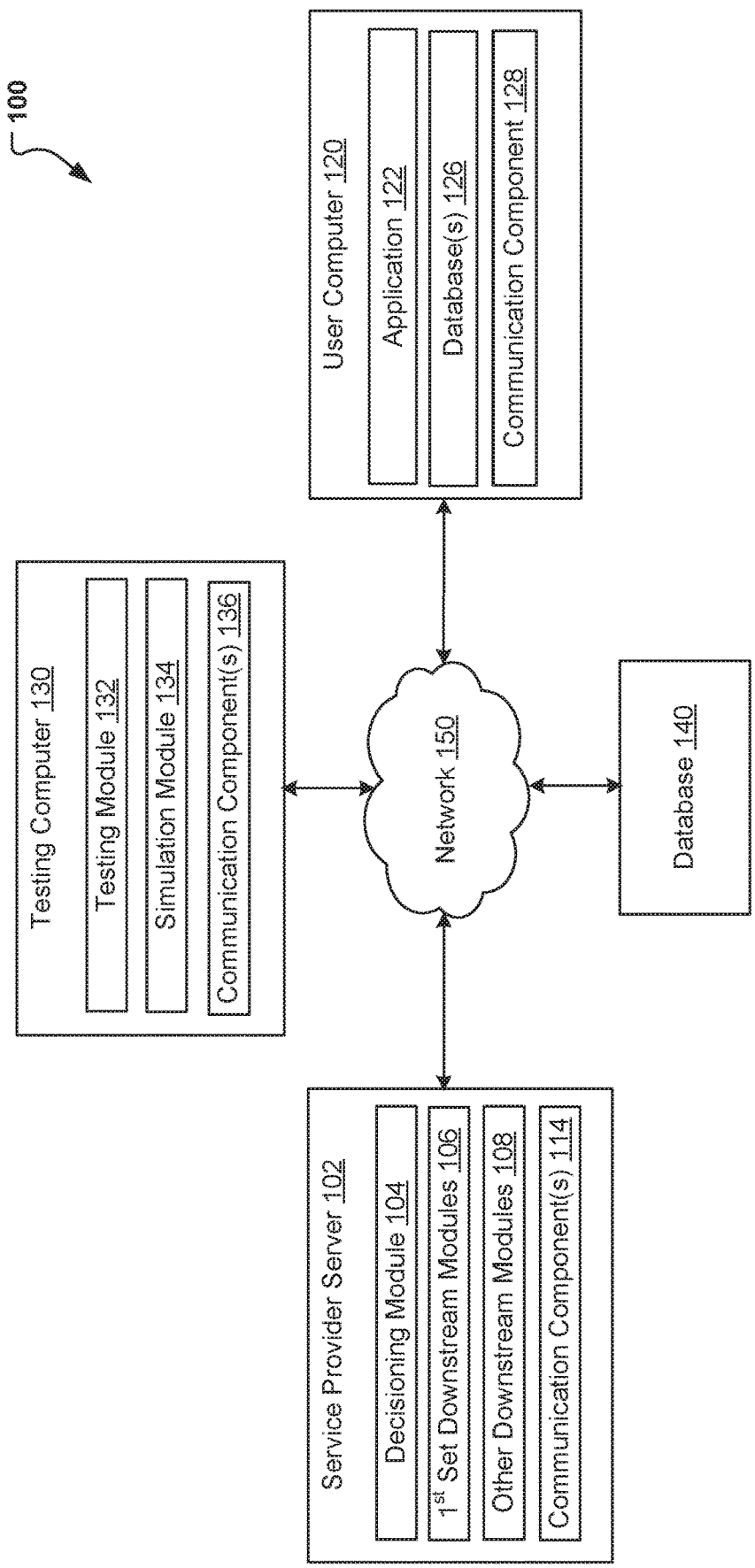
FIG. 1 is a block diagram illustrating an example system for implementing a rules testing framework, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "alignment module configured to perform a sequence alignment algorithm" is intended to cover, for example, a device that performs this function during operation, even if the corresponding device is not currently being used (e.g., when its battery is not connected to it). Thus, an entity described or recited as "configured to" perform some task refers to something physical, such as a device, circuit, or memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for an algorithm for implementing a rule testing framework. In certain embodiments, a service provider system operates in a live production environment and includes a decisioning module. The decisioning module may be configured to execute a rules engine. For example, given a set of input parameters, the decisioning module determines a particular rule from a set of rules to apply and generates an output decision based on the particular rule.

In a normal operating mode, in order to determine the particular rule to apply for the set of input parameters, the decisioning module may be configured to request data from a first set of downstream service modules. Further, each of the downstream modules in the first set of downstream modules may be configured to request information from additional service modules even further downstream. As such, the output of the decisioning module may be dependent on the respective outputs of the first set of downstream service modules, and the respective outputs of the first set of downstream service modules may be dependent on the respective outputs of the additional service modules. The chain of dependencies between the decisioning module, the first set of downstream service modules, and the additional service modules even further downstream can be any length.

Eventually at the end of the chain, certain service modules are configured to access a database to obtain data to fulfill their respective requests. These service modules generate respective outputs based on the obtained data and provide their respective outputs upstream to the service modules that requested information from them. Such outputs are continually generated and provided to service modules upstream, and eventually, the first set of service modules receive respective responses to their requests. Each of the first set of service modules generates a respective output based on the respective responses and provides the respective output to the decisioning module. The decisioning module is then able to apply a rule based on the respective outputs to generate an output decision.

In view of the system described above, a tester may wish to test that a particular rule is functioning properly within the system. The particular rule may be associated with a set of rule criteria and may be triggered and applied by the decisioning module when the outputs of the first set of downstream service modules satisfy the set of rule criteria. However, it may be difficult to directly trigger the rule because of the chain of dependencies among the downstream service modules. For instance, in order to trigger the rule, a test may typically need to fix the output values for each of the additional downstream service modules in order to ensure that the first set of downstream service modules outputs the desired values that satisfy the set of rule criteria.

According to a particular embodiment, a testing module may be implemented that is configured to efficiently test one or more rules of the set of rules of the system within the live production environment. The testing module may be configured to receive a test file that includes one or more test scenarios. Each test scenario may correspond to a particular rule to be tested, and each test scenario may be associated with a respective tracking identifier. Further, each test scenario may include respective predetermined output values for each of the first set of downstream service modules that satisfy the rule criteria for its respective rule.

The testing module is configured to identify a particular test scenario from the test file and to prepare test application data to transmit to the decisioning module. Further, the testing module is configured to preload/store the respective predetermined output values of the first set of downstream service modules in the database of the live production environment. Each of the respective predetermined output values may include an indication of its corresponding service module from the first set of downstream service modules. Further, each of the respective predetermined output values may be associated with the tracking identifier.

Subsequently, the testing module transmits the test application data to a server that executes the decisioning module in the live production environment. The test application data may be included in a request for an output decision. Based on the test application data included in the request, the decisioning module determines that the request is for simulation purposes. For instance, the decisioning module may identify the tracking identifier and/or another flag or indication included in the request that indicates the request is for simulation purposes. In certain embodiments, the request may cause the decisioning module to switch from the normal operating mode to a simulation mode.

In response to determining that the request is for simulation purposes, the decisioning module may transmit respective test information requests to each of the first set of downstream service modules with each of the test information requests including the tracking identifier. The test information requests may cause each of the first set of downstream service modules to transmit their own information requests to a simulation module, instead of normally communicating with the additional downstream service modules. The simulation module is configured to access the database (e.g., using the tracking identifier) based on the information requests and to retrieve the respective predetermined output values that were previously stored in the database by the testing modules.

The simulation module transmits, to each service module of the first set of downstream service modules, a response that includes the appropriate predetermined output value corresponding to the service module. Each of the first set of downstream service modules is configured to subsequently provide its respective predetermined output values to the decisioning module. Based on the respective predetermined output values that satisfy the rule criteria for the particular rule, the decisioning module is configured to apply the particular rule to generate an output decision. The decisioning module transmits the output decision back to the testing module.

The testing module is configured to determine whether the output decision from the decisioning module satisfies a set of test criteria. For instance, the testing module may determine whether the output decision matches an expected output decision. If the output decision satisfies the set of test criteria, the testing module determines that the test scenario is passed. Otherwise, the testing module may determine that the test scenario has failed.

FIG. 1 is a block diagram illustrating an example system 100 for implementing a rules testing framework. In the illustrated embodiment, the system 100 includes a service provider server 102 of a service provider in communication with user computer 120, testing computer 13, and database 140 via a network 150.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, the service provider server 102 may include a decisioning module 104 that is configured to generate an output decision based on a set of input parameters, such as from the application 122 executed by the user computer 120. For example, in some implementations, the service provider server may be maintained by a payment provider that provides payment services. The application 122 of the user computer 120 may communicate with the service provider server 102 and transmit requests to perform a payment related transaction. The requests may include the input parameters that are provided to the decisioning module 104. In response to such requests, the decisioning module 104 may be configured to output a riskiness score associated with processing the payment transaction, the user, and/or any other aspects of the payment transaction.

More particularly, the decisioning module 104 may be configured to determine a particular rule from a set of rules to apply given the set of input parameters. For example, based on the set of input parameters, the decisioning module 104 may transmit respective information requests to a first set of downstream service modules 106. As such, the determination of which rule from the set of rules to apply (and therefore the output decision) may depend on the respective outputs of the first set of downstream service modules 106. The output of the first set of downstream modules 106 may further depend on the output of other downstream modules 108.

Figure 2A:
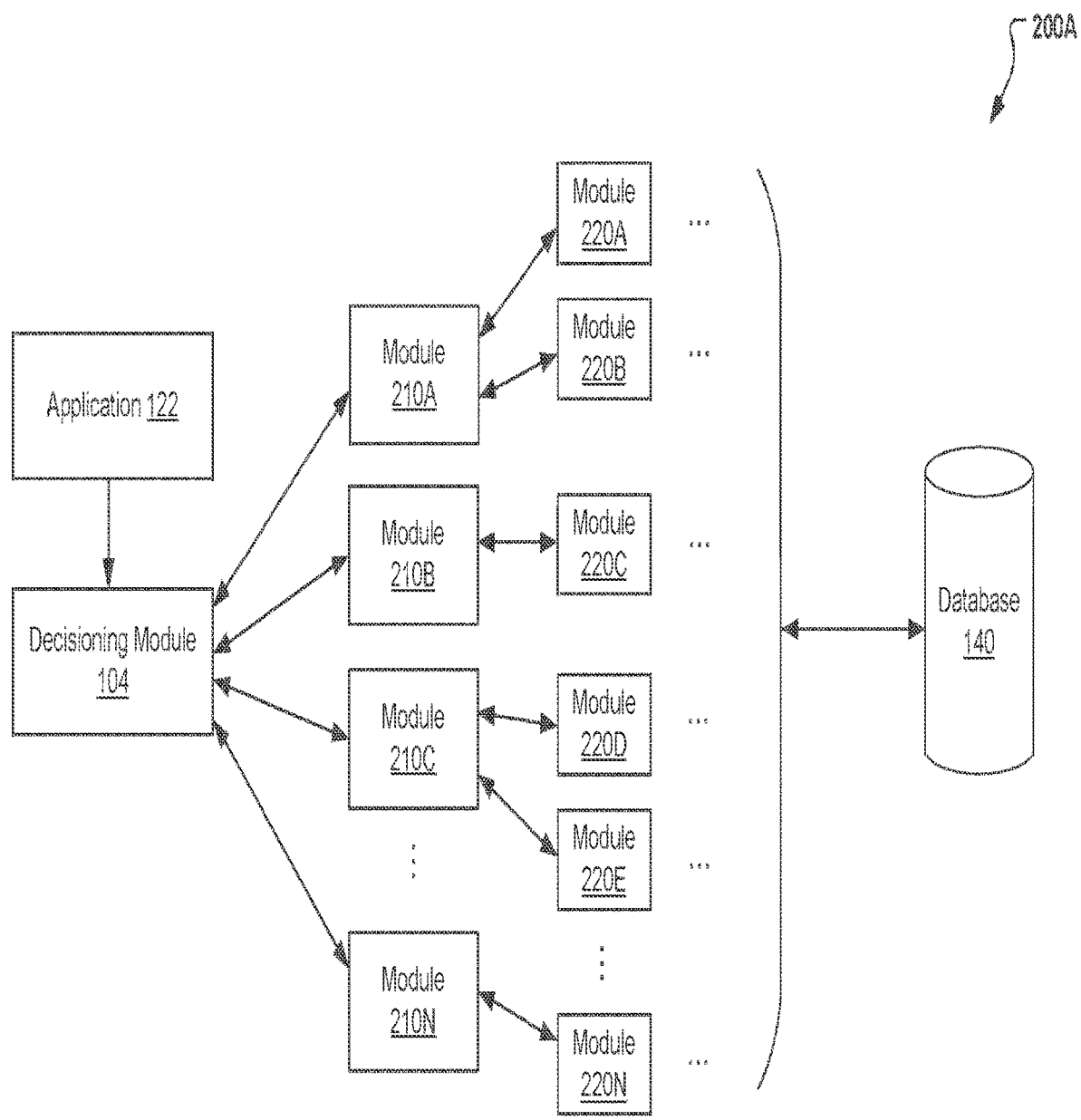
FIG. 2A illustrates a diagram illustrating an example configuration of a decisioning module and its relationship with various downstream modules, according to some embodiments.
Figure 2B:
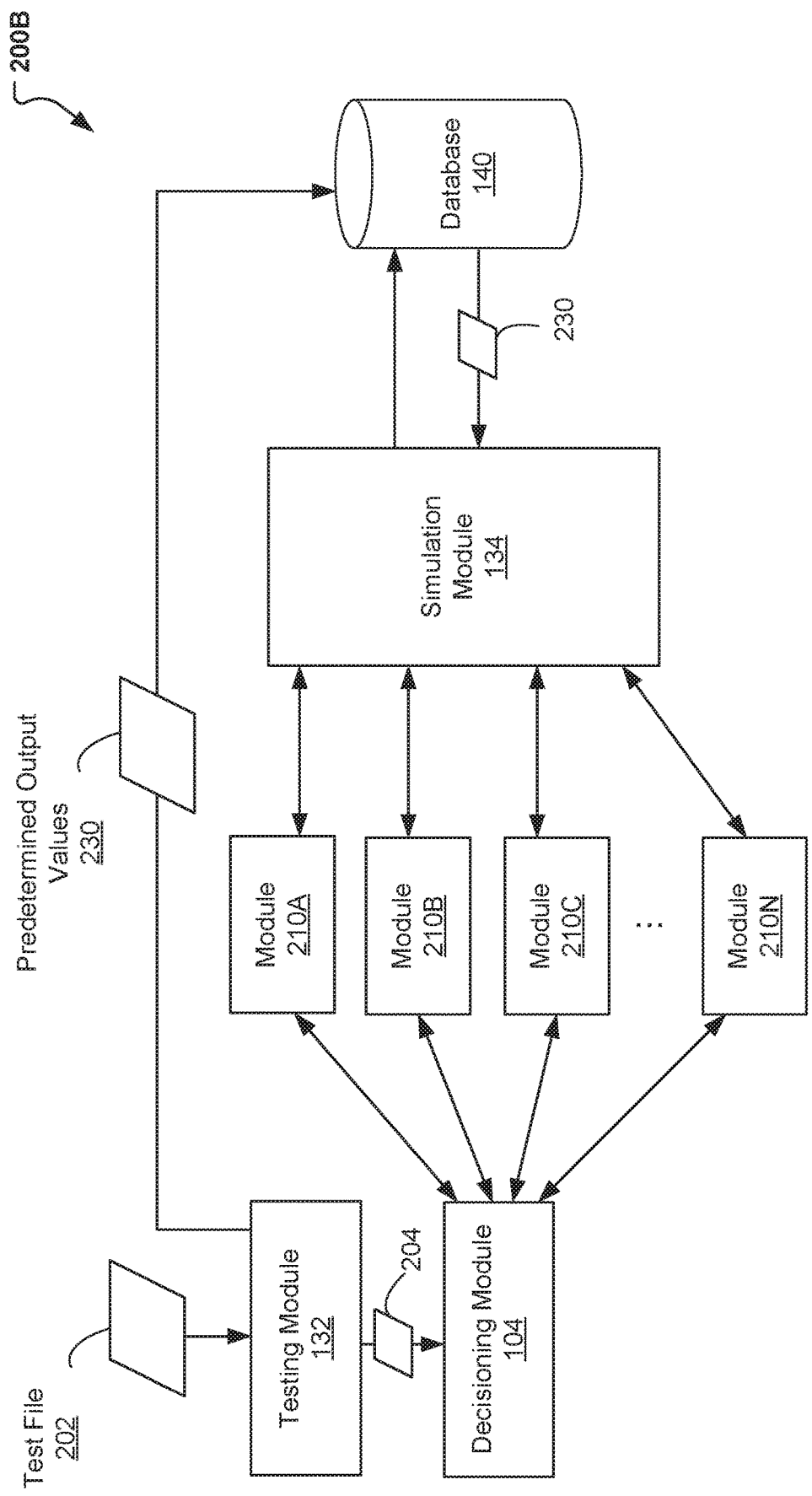
FIG. 2B illustrates a diagram illustrating a different example configuration of the decisioning module and its relationship with various downstream modules, according to some embodiments.

For example, FIG. 2A illustrates a block diagram 200A of an example configuration of the decisioning module 104 and its relationship with various downstream modules. Further, FIG. 2A depicts how the decisioning module 104 operates in a normal operation mode. For instance, the decisioning module 104, as previously discussed, receives a request for an output decision based on communication between the service provider server 102 and the application 122. Based on the input parameters included in the request for the output decision, the decisioning module 104 transmits respective information requests to modules 210A-N. Modules 210A-N may correspond to the first set of downstream modules 106. It will be appreciated that modules 210A-N may represent any number of modules and that other embodiments may include a greater or fewer number of modules than depicted. It will also be appreciated that while FIG. 2A-B illustrate the decisioning module 104 being directly dependent on module 210A-N, there may be any number of intermediary downstream modules (from the decisioning module 104) between the decisioning module 104 and modules 210A-N.

Based on the respective information requests received from the decisioning module 104, each of modules 210A-N may transmit additional information requests to modules 220A-N that are further downstream, and which correspond to other downstream modules 108. As such, the output decision of the decisioning module 104 directly depends on the respective outputs of modules 210A-N, which in turn depend on the outputs of their respective modules from modules 220A-N. Thus, a chain of dependencies is shown in FIG. 2A with the decisioning module 104 as the root node. Further, the chain may be any length, and may include additional or fewer downstream modules than shown. The decisioning module 104, modules 210A-N, modules 220A-N, and the database all operate within a live production environment maintained by the service provider that can interact with user computers.

At the end of the chain, the furthest downstream modules may access a database 140 and retrieve the appropriate information based on information requests received from modules further upstream. Each module may generate its respective output and transmit the respective output back upstream. For instance, modules 220A-B may generate respective outputs from modules further downstream, and may provide the generated respective outputs to module 210A. Similarly, module 220C may provide its output to module 210B, modules 220D-E may provide their respective outputs to module 210C, and so forth. Modules 210A-N may then be able to generate their respective outputs and provide those respective outputs to decisioning module 104.

Based on the respective outputs of 210A-N satisfying rule criteria of a particular rule from the set of rules, the decisioning module 104 is configured to apply the particular rule to generate the output decision. Based on the output decision, the service provider server 102 may be configured to generate a response to the request from application 122.

Referring back to FIG. 1, the communication component 114 may be configured to communicate with various other devices, such as the user computer 120 and/or other devices. In various embodiments, communication component 114 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

The system 100 also includes testing computer 130, which may include a testing module 132 and communication components 134. The testing module 132 may be configured to receive a test file that stores one or more test scenarios. Each test scenario may correspond to a particular rule to be tested, and each test scenario may be associated with a respective tracking identifier. Further, each test scenario may include respective predetermined output values, for each of the first set of downstream service modules 106, that satisfy the rule criteria for its respective rule. The testing module 132 is configured to test each test scenario within the context of the live production environment in which the decisioning module 104 operates.

For example, FIG. 2B illustrates a block diagram 200B of the system 100 when it is operating in simulation mode rather than the normal operating mode as illustrated in FIG. 2A. As previously discussed, the testing module 132 receives a test file 202. From the test file 202, the testing module 132 identifies a test scenario for testing a particular rule. The test scenario includes and/or otherwise indicates a tracking identifier and respective predetermined output values for each of the first set of downstream modules 106 (e.g., modules 210A-N).

The testing module 132 may be configured to preload the database 140 with the predetermined output values 230 of modules 210A-N. In some embodiments, each of the predetermined output values 230 may be associated with a module identifier corresponding to its respective module. For instance, a first module identifier corresponding to module 210A may be associated with the predetermined output value designated for module 210A. Similarly, a second module identifier corresponding to module 210B may be associated with the predetermined output value designated for module 210B, and so forth for the remaining modules 210C-N. Moreover, each of the predetermined output values 230 may be associated with the tracking identifier. Thus, the testing module 132 stores, in the database 140, associations between each predetermined output value 230, its module identifier, and the tracking identifier.

The testing module 132 transmits a request for an output decision to the decisioning module 104. The test request includes test application data 204, and based on the test application data 204, the decisioning module switches from the normal operating mode to the simulation mode. For example, the test application data 204 may include the tracking identifier, and the decisioning module 104 may switch to the simulation mode based on detecting the tracking identifier. In other embodiments, the test application data 204 may include a separate flag that is identified by the decisioning module 104 and which causes the switch to the simulation mode.

In response to switching to the simulation mode, the decisioning module 104 is configured to transmit respective test information requests to each of the first set of downstream service modules 106 (e.g., modules 210A-N). The test information requests may each include the tracking identifier. Further, test information requests may cause each of modules 210A-N to transmit their own information requests to the simulation module 134, rather than modules 220A-N, as shown in FIG. 2A which illustrates the operation of the decisioning module in the normal operating mode. Each of the information requests transmitted by the module 210A-N to the simulation module 134 includes the tracking identifier and the respective module identifier corresponding to the respective module 210A-N.

For each information request received from the modules 210A-N, the simulation module 134 uses the tracking identifier and the respective module identifier to retrieve the corresponding predetermined output value (of the predetermined output values 230) from the database 140. The corresponding predetermined output value is provided by the simulation module 134 back to the module that corresponds to the module identifier as a response to the information request. Thus, each module 210A-N receives its corresponding predetermined output value 230 that was previously stored in the database 140 by the testing module 132.

The modules 210A-N are configured to provide the predetermined output values 230 back to the decisioning module 104. Since the predetermined output values 230 satisfy the rule criteria associated with the particular rule of the test scenario, the decisioning module 104 is configured to generate an output decision based on applying the particular rule to the predetermined output values. The decisioning module 104 subsequently transmits the output decision to the testing module 132.

The testing module 132 is configured to compare the output decision of the decisioning module 104 with test criteria. If the output decision satisfies the test criteria, the testing module 132 determines that the test scenario is passed, and/or the particular rule is functioning properly. If the output decision fails to satisfy the test criteria, the testing module 132 may determine that the test scenario has failed and/or that the particular rule is not working as intended. For instance, the test criteria may include an expected output decision associated with the particular rule. As such, the testing module 132 may determine whether the output decision generated by the decisioning module 104 matches or is within an acceptable range of the expected output decision. If so, the test scenario is passed, and if not, the test scenario has failed.

FIG. 1 further illustrates the user computer 120, which includes application 122, database 126, and communication component 128. As previously discussed, the user computer 120 may communicate, via the application 122, with the service provider server 102. Based on communication between the application 122 and the service provider server 102, a request for an output decision may be generated and transmitted to the decisioning module 104.

The database 140 stores various information used to implement the techniques described herein. In certain embodiments, the database 112 may store the index file, similarity scores, pairing information associated with word pairs, and/or the like.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 3:
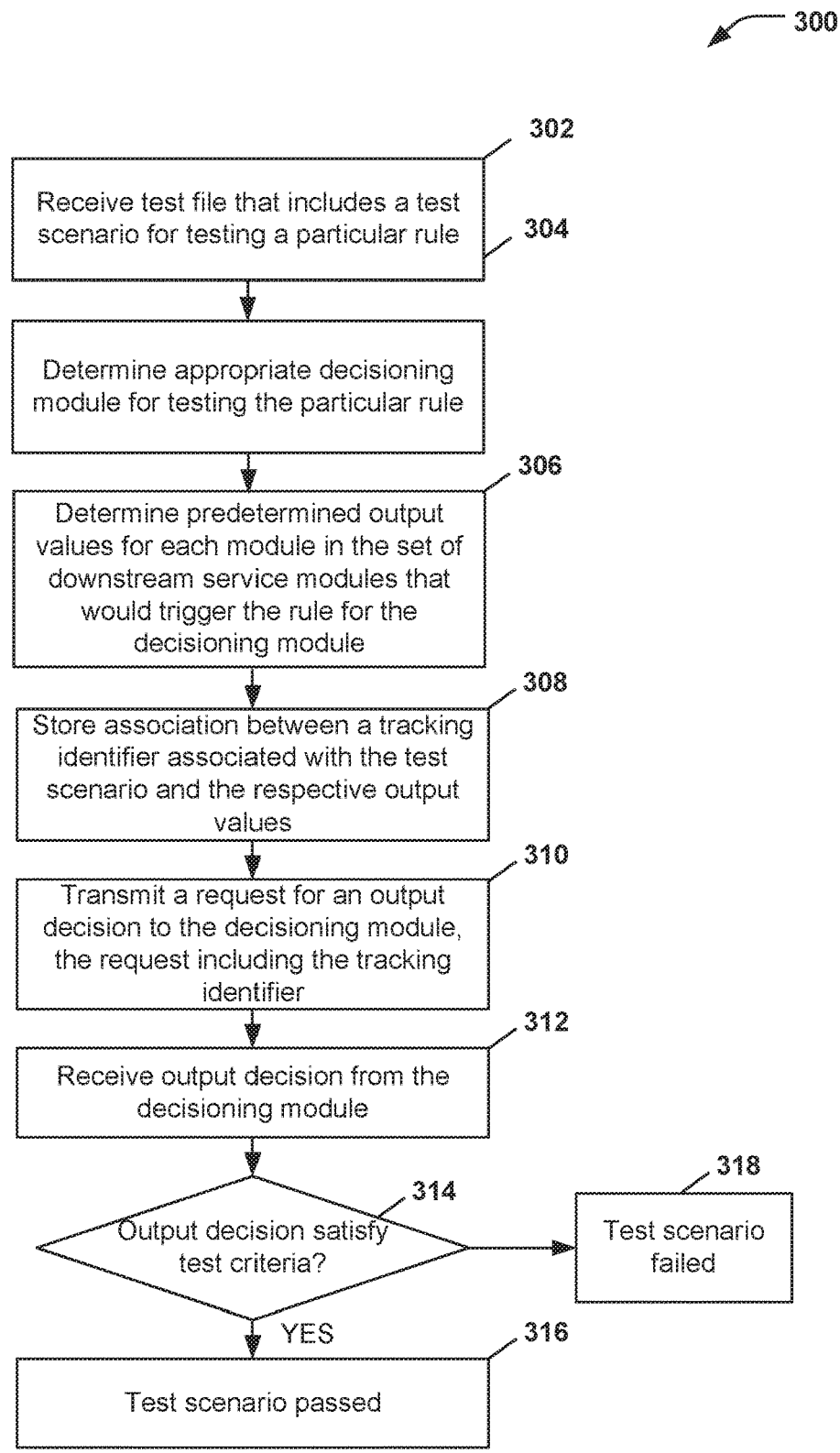
FIG. 3 illustrates a flow diagram illustrating a method for implementing a rules testing framework from the perspective of a testing module, according to some embodiments.

FIG. 3 illustrates an example flow diagram of a method 300 for testing a rule within the rules testing framework from the perspective of the testing module, according to certain embodiments. The method 300 begins at step 302, where the testing module 132 receives a test file that includes a test scenario for testing a particular rule. As previously discussed, the test file may include multiple test scenarios. Further the test scenario for testing the particular rule may be associated with a tracking identifier.

At step 304, based on the test scenario, the testing module 132 determines the appropriate decisioning module for testing the particular rule. For instance, the testing module 132 may determine that decisioning module 104 is the appropriate module for triggering the particular rule.

At step 306, the testing module 132 may determine predetermined output values for each module in a set of downstream service modules that would trigger the particular rule for the decisioning module 104. For instance, the predetermined output values may correspond to values that are output by the first set of downstream service modules 106 in order to trigger the particular rule. At step 308, the testing module 132 stores/preloads a database (e.g., database 140) with the predetermined output values. The predetermined output values may be associated with the tracking identifier corresponding to the test scenario.

At step 310, the testing module 132 transmits a request for an output decision to the decisioning module 104. The request may include the tracking identifier. At step 312, the testing module 132 receives an output decision 312 from the decisioning module 104, and at step 314, the testing module 132 determines whether the output decision satisfies test criteria. If so, the method 300 proceeds to step 316, and the testing module 132 determines that the test scenario has been passed. If the output decision does not satisfy the test criteria, the method 300 proceeds to step 318, and the testing module 132 determines that the test scenario has failed.

Figure 4:
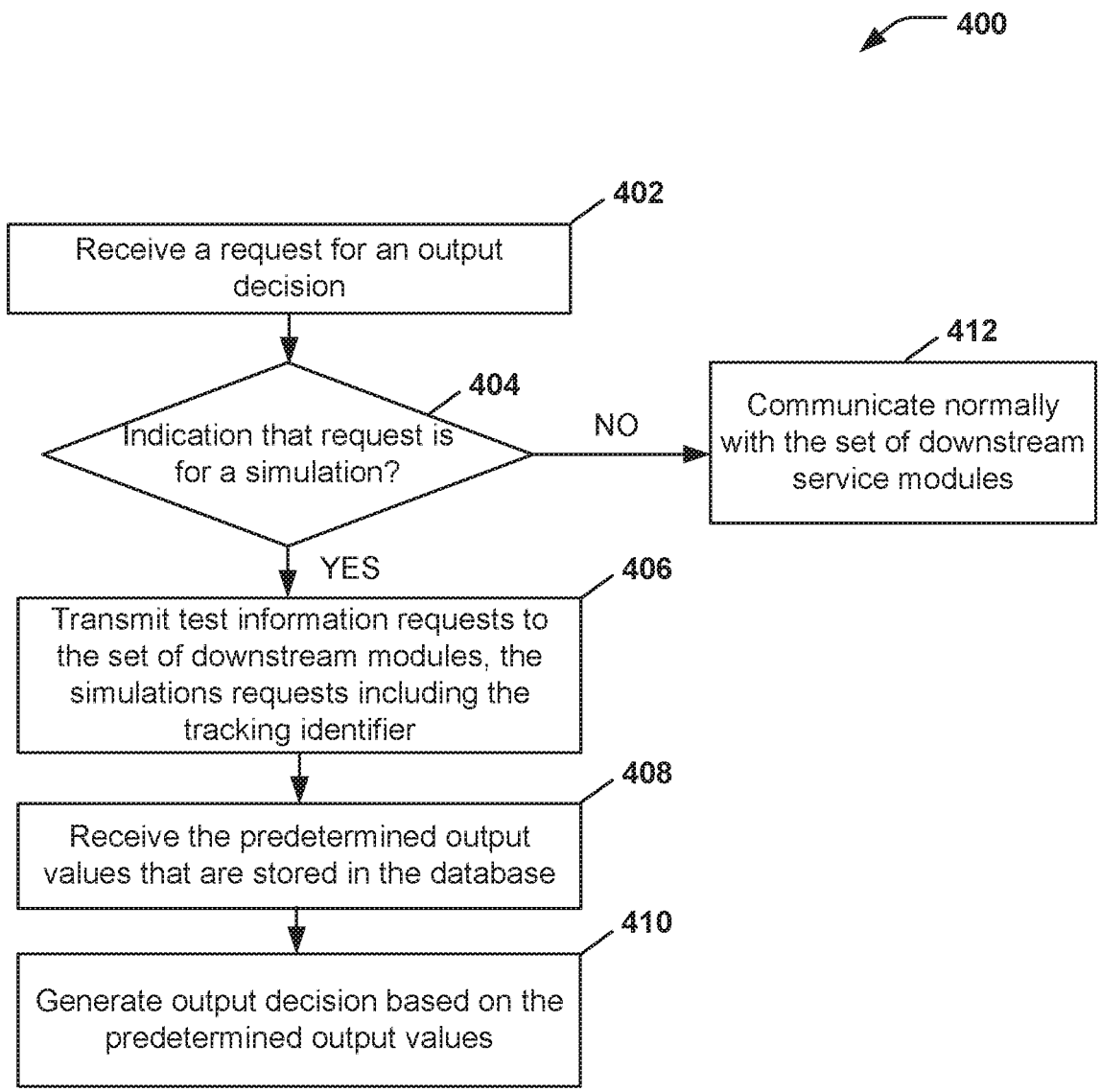
FIG. 4 is a flow diagram illustrating a method for implementing a rules testing framework from the perspective of a decisioning module, according to some embodiments.

FIG. 4 illustrates an example flow diagram of a method 400 that describes the operations of the decisioning module in testing the particular rule within the rules testing framework, according to one or more particular embodiments. The method 400 begins at step 402, where the decisioning module 104 receives a request for an output decision, such as the request transmitted by the testing module 132 in step 310 of FIG. 3.

At step 404, the decisioning module 104 may determine whether the request includes an indication to switch to a simulation mode. For example, the request may include the tracking identifier associated with the test scenario, as previously described with respect to FIG. 3. The presence of the tracking identifier may indicate that the request is for testing/simulation purposes. In other embodiments, the request may include another indication, such as a separate flag, to indicate that the request is for testing/simulation purposes.

If the decisioning module 104 determines that the request is for simulation purposes, the decisioning module 104 switches from a normal operating mode to the simulation mode, and the method 400 proceeds to step 406. If the decisioning module 104 determines that the request is not for simulation purposes, the method 400 proceeds to step 412, where the decisioning module 104 communicates as normal with a set of downstream service modules (e.g., the first set of downstream service modules 106, modules 210A-N) as previously discussed with references to FIG. 1 and FIG. 2A.

At step 406, the decisioning module 104 transmits test information requests to the first set of downstream service modules 106. The test information requests may include the tracking identifier. At step 408, the decisioning module 104 receives the predetermined output values that are stored in the database 140. The predetermined output values correspond to values that trigger the particular rule being tested by the test scenario. At step 410, the decisioning module 104 is configured to generate an output decision based on the predetermined output values.

Figure 5:
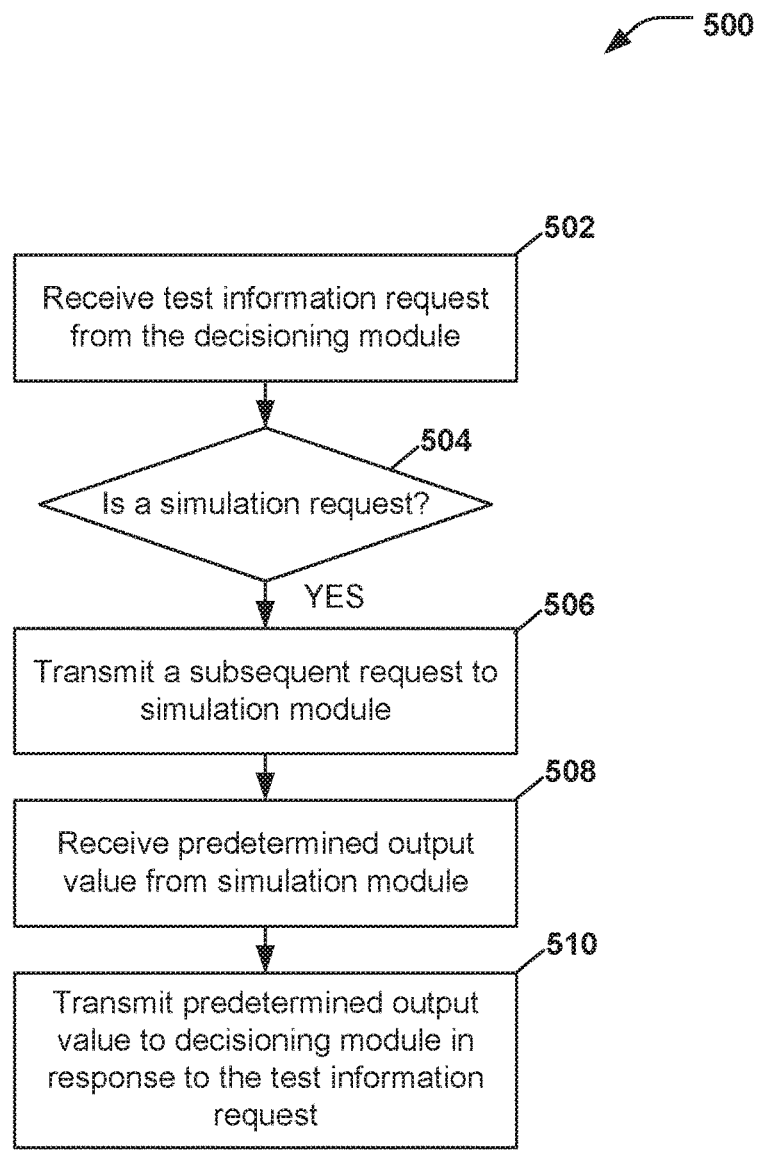
FIG. 5 illustrates a flow diagram illustrating a method for implementing a rules testing framework from the perspective of a downstream service module, according to some embodiments.

Referring now to FIG. 5, a flow diagram is depicted of a method 500 that describes the operations of a downstream service module from the first set of downstream modules 106, according to an embodiment. The method 500 begins at step 502, where a module of the first set of modules 106 receives a test information request from the decisioning module 104. Step 502 corresponds to step 406 of FIG. 4. The test information request may include the tracking identifier corresponding to the test scenario.

At step 504, a determination is made as to whether the test information request is for simulation purposes. In certain embodiments, the module 106 identifies the tracking identifier included in the test information request, and based on the tracking identifier, transmits a subsequent request to the simulation module 134 at step 506. The subsequent request may include the tracking identifier as well and may also include a module identifier associated with the module.

At step 508, the module may receive a predetermined output value from the simulation module 134 that corresponds to the module identifier and the tracking identifier. As previously discussed, an association between the module identifier, the tracking identifier, and the predetermined output value are previously stored in a database by the testing module 132. As such, the simulation module 132 is configured to retrieve the predetermined output value using the module identifier and the tracking identifier included in the subsequent request described in step 506.

At step 510, the module is configured to transmit the predetermined output value back to the decisioning module 104 in response to the test information request described in step 502. According to certain embodiments, the method 500 described in FIG. 5 may be performed by each of the first set of downstream modules 106 (e.g., modules 210A-N) in response to receiving respective test information requests from the decisioning module 104.

Example Computing Device

Figure 6:
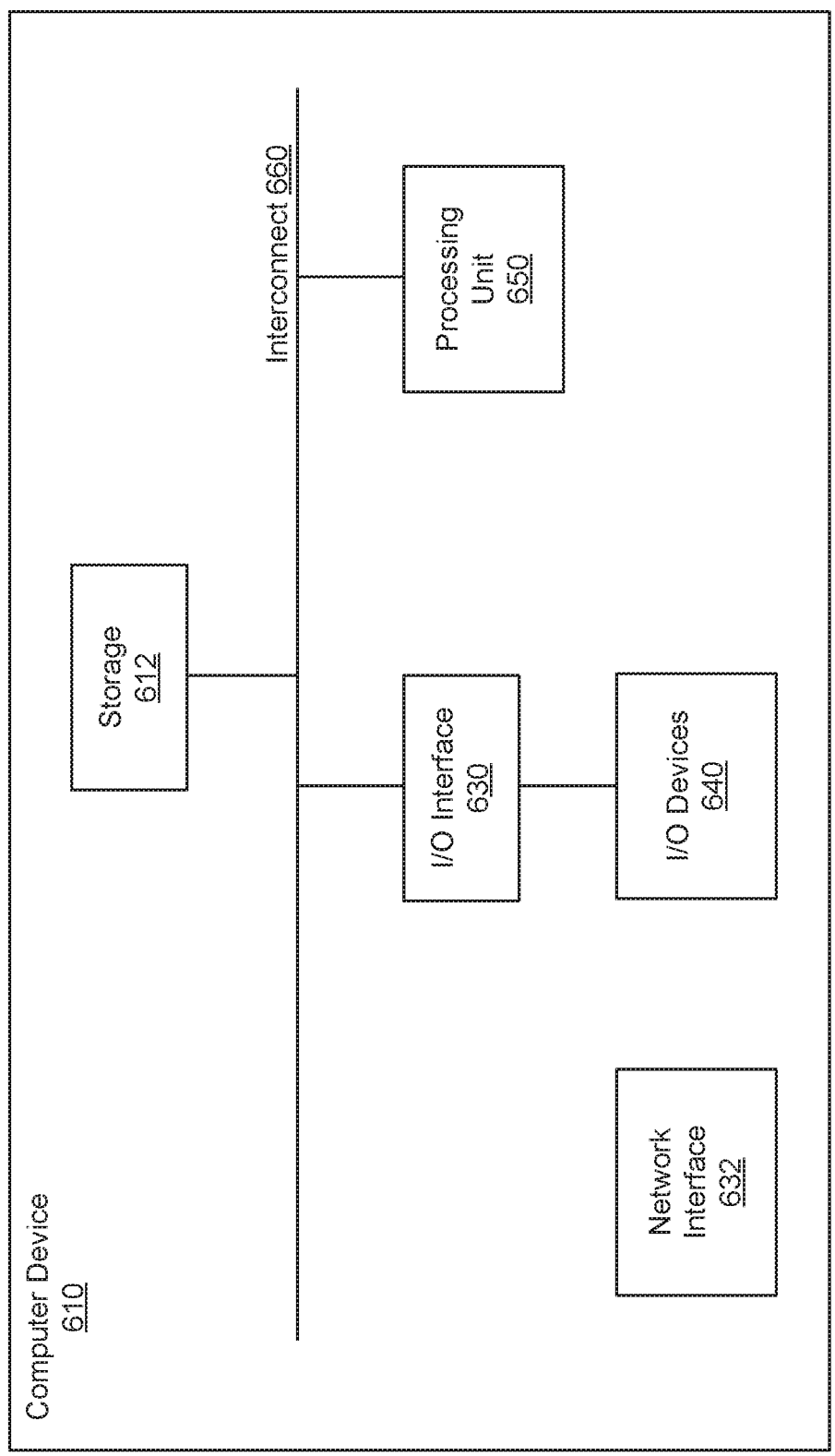
FIG. 6 is a block diagram illustrating an exemplary computing device, according to some embodiments.

Turning now to FIG. 6, a block diagram of one embodiment of computing device (which may also be referred to as a computing system) 610 is depicted. Computing device 610 may be used to implement various portions of this disclosure including the components illustrated in FIG. 1. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 612 may consist solely of volatile memory, in one embodiment. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature.

Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   one or more hardware processors; and
   a memory storing computer-executable instructions, that in response to execution by the one or more hardware processors, causes the system to perform operations comprising:
   receiving a file that includes a test scenario for testing a decisioning rule within a live production environment, wherein:
   a decisioning module included in the live production environment is configured to trigger the decisioning rule in response to output values of a first set of downstream modules satisfying a set of rules criteria; and
   the output values of the first set of downstream modules are dependent on output values of a second set of downstream modules;
   preloading a database with designated output values for the one or more dependent modules, the designated output values satisfying the set of rules criteria;
   transmitting a decisioning request to the decisioning module, the decisioning request causing the first set of downstream modules to communicate with a simulation module instead of the second set of downstream modules, the simulation module configured to retrieve, based on communication with the first set of downstream modules, the designated output values from the database and transmit the designated output values to the first set of downstream modules;
   receiving a decision response output from the decisioning module based on the designated output values; and
   determining a test outcome corresponding to the test scenario for the decisioning rule by comparing the decision response output with an expected output.

2. The system of claim 1, wherein the preloading the database further comprises:
   storing, in the database, an association between the designated output values and a tracking identifier corresponding to the test scenario file.

3. The system of claim 2, wherein the decisioning request includes the tracking identifier and the simulation module retrieves the designated output values from the database using the tracking identifier.

4. The system of claim 1, wherein the test scenario file includes the designated output values, the test scenario file indicating a respective output value of the designated output values for each downstream module of the first set of downstream modules.

5. The system of claim 1, wherein the transmitting of the decisioning request to the decisioning module causes the decisioning module to switch from a normal operating mode to a simulation mode.

6. The system of claim 5, wherein the decisioning module, when operating in the normal operating mode, is configured to cause the first set of downstream modules to communicate requests to the second set of downstream modules instead of the simulation module.

7. The system of claim 1, wherein the first set of downstream modules is downstream from the decisioning module, and the second set of downstream modules is downstream from the first set of downstream modules.

8. The system of claim 1, wherein the determining the test outcome further comprises:
   determining whether execution of the decisioning rule within the live production environment passes the test scenario.

9. The system of claim 8, wherein the file stores a plurality of test scenarios corresponding to one or more other decisioning rules.

10. A method, comprising:
    receiving, by a decisioning module being executed by a computer comprising one or more hardware processors in a live production environment, a request for an output decision corresponding to a set of input parameters, the request including a tracking identifier associated with a test scenario;
    determining a set of downstream modules, the output decision of the decisioning module being dependent on respective outputs of each of the set of downstream modules, wherein the set of downstream modules, when operating in a default configuration, is configured to request information from one or more dependent modules;
    based on information included in the request for the output decision, causing each of the set of downstream modules to switch from the default configuration to a simulation configuration, wherein responsive to being switched to the simulation configuration, each of the set of downstream modules transmits respective information requests to a simulation module, the simulation module configured to transmit fixed output values corresponding to the set of downstream modules in response to the respective information requests;
    generating the output decision according to a decisioning rule that is triggered based on the fixed output values; and
    transmitting the output decision to a testing module.

11. The method of claim 10, wherein each of the respective information requests includes the tracking identifier, and wherein the simulation module accesses a database using the tracking identifier to obtain the fixed output values, the database storing an association between the fixed output values and the tracking identifier.

12. The method of claim 11, wherein the association between the fixed output values and the tracking identifier is stored in the database prior to the decisioning module receiving the request for the output decision.

13. The method of claim 11, wherein the set of downstream modules and the respective one or more dependent modules operate within the live production environment.

14. The method of claim 13, wherein the testing module operates independently of the live production environment.

15. The method of claim 11, further comprising:
comparing, by the testing module, the output decision with an expected output decision; and
based on the comparing, determining whether the test scenario is passed.

16. A non-transitory computer readable medium storing computer-executable instructions that in response to execution by one or more hardware processors, causes a computer to perform operations in a live production environment, the operations comprising:
receiving a request for an output decision corresponding to a set of input parameters, the request including a test indication;
determining that the output decision is dependent on an output of a first module, the first module configured by default to communicate with a second module, and the output of the first module being dependent on the output of the second module;
based on the test indication, causing the first module to transmit an information request to a simulation module, the simulation module identifying a predetermined output value corresponding to the first module in response to the information request;
generating the output decision according to a decisioning rule that is triggered based on the predetermined output value; and
transmitting the output decision to a testing module.

17. The non-transitory computer readable medium of claim 16, wherein the information request includes a module identifier associated with the first module and a tracking identifier associated with a test scenario for testing the decisioning rule.

18. The non-transitory computer readable medium of claim 17, wherein the simulation module identifies the predetermined output value by using the module identifier and the tracking identifier to access a database.

19. The non-transitory computer readable medium of claim 18, wherein an association between the module identifier, the tracking identifier, and the predetermined output value is stored in the database prior to the decisioning module receiving the request for the output decision.

20. The non-transitory computer readable medium of claim 16, wherein the operations further comprise:
comparing, by the testing module, the output decision with an expected output decision; and
based on the comparing, determining whether a test scenario is passed.

* * * * *